United States Patent [19]

Moser

[11] Patent Number: 4,754,022

[45] Date of Patent: Jun. 28, 1988

[54] CATIONIC DYES FROM DIAZOTIZED 5-AMINOISOTHIAZOLES AND TETRAHYDROQUINOLINES OR INDOLINES

[75] Inventor: Peter Moser, Binningen, Switzerland

[73] Assignee: Ciba-Geigy Corporation, Ardsley, N.Y.

[21] Appl. No.: 790,923

[22] Filed: Oct. 24, 1985

[30] Foreign Application Priority Data

Nov. 13, 1984 [CH] Switzerland .......................... 5427/84

[51] Int. Cl.$^4$ ................. C09B 29/039; C09B 29/40; C09B 29/44; C09B 44/20
[52] U.S. Cl. ................................. 534/610; 534/589; 534/607; 534/613; 534/765; 534/766; 534/768
[58] Field of Search .............. 534/610, 607, 768, 766, 534/765, 589

[56] References Cited

U.S. PATENT DOCUMENTS

| | | | |
|---|---|---|---|
| 3,143,540 | 8/1964 | Meen et al. ........................ | 534/768 |
| 3,148,935 | 9/1964 | Pfitzner et al. ................. | 534/610 X |
| 3,585,182 | 6/1971 | Straley et al. .................. | 534/768 X |
| 3,948,877 | 4/1976 | Kuhlthau ........................... | 534/610 |
| 3,991,042 | 11/1976 | Kuhlthau ........................... | 534/610 |
| 4,070,352 | 1/1978 | Maner et al. ................... | 534/610 X |
| 4,104,268 | 8/1978 | Dorsch et al. ................... | 534/610 |
| 4,111,929 | 9/1978 | Fawkes ............................ | 534/610 |
| 4,247,458 | 1/1981 | Shuttleworth .................. | 534/753 X |
| 4,252,716 | 2/1981 | Kuhlthau ........................... | 534/610 |
| 4,314,817 | 2/1982 | Gertisser ...................... | 534/610 X |
| 4,330,467 | 5/1982 | Fleischer et al. ............... | 534/768 |

FOREIGN PATENT DOCUMENTS

| | | | |
|---|---|---|---|
| 1163775 | 2/1964 | Fed. Rep. of Germany ...... | 534/610 |
| 2556917 | 7/1976 | Fed. Rep. of Germany ...... | 534/610 |
| 1380104 | 1/1975 | United Kingdom ............... | 534/610 |
| 1399272 | 7/1975 | United Kingdom ............... | 534/610 |
| 2148918 | 6/1985 | United Kingdom ............... | 534/768 |

*Primary Examiner*—Floyd D. Higel

*Attorney, Agent, or Firm*—Edward McC. Roberts; Meredith C. Findlay

[57] ABSTRACT

The invention relates to novel cationic isothiazolazo compounds of the formula

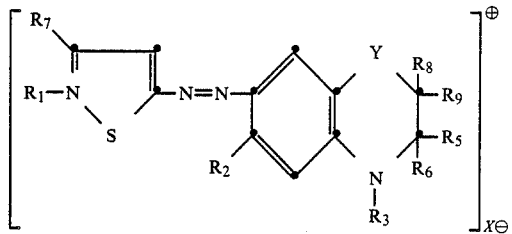

wherein
  $R_1$ is unsubstituted or substituted $C_1$–$C_4$alkyl
  $R_2$ is hydrogen or $C_1$–$C_4$alkyl,
  $R_3$ is hydrogen or $C_1$–$C_4$alkyl which is unsubstituted or substituted by halogen, cyano, $C_1$–$C_4$alkoxy or by phenyl which is in turn unsubstituted or substituted by methyl, methoxy and/or halogen,
  $R_5$ and $R_6$ are each independently of the other hydrogen or $C_1$–$C_4$alkyl
  $R_7$ is hydrogen, $C_1$–$C_4$alkyl or phenyl,
  Y is the direct bond or the group

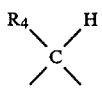

wherein $R_4$ is hydrogen or $C_1$–$C_4$alkyl,
  $R_8$ and $R_9$ are each hydrogen and, if Y is the direct bond, they are each independently of the other hydrogen or $C_1$–$C_4$alkyl, and
  $X^\ominus$ is an anion.

These compounds can be used as dyes for dyeing or printing in particular polyacrylonitrile materials in blue shades.

16 Claims, No Drawings

CATIONIC DYES FROM DIAZOTIZED 5-AMINOISOTHIAZOLES AND TETRAHYDROQUINOLINES OR INDOLINES

The present invention relates to novel cationic isothiazolazo compounds, to the preparation thereof and to the use thereof as dyes for dyeing or printing materials which can be dyed with cationic dyes, in particular polyacrylonitrile materials or acid modified polyamide and polyester materials.

The novel cationic isothiazolazo compounds are of the formula

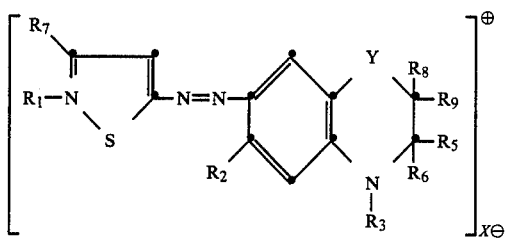

wherein
$R_1$ is unsubstituted or substituted $C_1-C_4$alkyl
$R_2$ is hydrogen or $C_1-C_4$alkyl,
$R_3$ is hydrogen or $C_1-C_4$alkyl which is unsubstituted or substituted by halogen, cyano, $C_1-C_4$alkoxy or by phenyl which is in turn unsubstituted or substituted by methyl, methoxy and/or halogen,
$R_5$ and $R_6$ are each independently of the other hydrogen or $C_1-C_4$alkyl
$R_7$ is hydrogen, $C_1-C_4$alkyl or phenyl,
Y is the direct bond or the group

wherein $R_4$ is hydrogen or $C_1-C_4$alkyl,
$R_8$ and $R_9$ are each hydrogen and, if Y is the direct bond, they are each independently of the other hydrogen or $C_1-C_4$alkyl, and
$X^\ominus$ is an anion.

An unsubstituted or substituted $C_1-C_4$alkyl radical $R_1$ may be a branched or unbranched alkyl radical; e.g. methyl, ethyl, n-propyl, isopropyl, n-butyl, sec-butyl and tert-butyl. Suitable substituents are for example hydroxy, halogen, aminocarbonyl, alkoxycarbonyl, acyl, acyloxy (acyl is preferably alkylcarbonyl), phenyl, phenoxy or benzyloxy. The substituent phenyl may be unsubstituted or substituted by methyl, methoxy and/or halogen. Alkyl radicals (including those in compound radicals) preferably contain 1 to 4 carbon atoms. Preferred substituents are alkyl groups $R_1$ are hydroxy, phenyl or $C_1-C_4$alkoxy (e.g. methoxy and ethoxy). In preferred compounds, $R_1$ is methyl or ethyl, each unsubstituted or substituted by hydroxy.

A $C_1-C_4$alkyl radical $R_2$ may also be unbranched or branched (e.g. methyl, ethyl, n-propyl and isopropyl). In preferred compounds, $R_2$ is hydrogen, $CH_3$ or $C_2H_5$.

A $C_1-C_4$alkyl radical $R_3$ may be a branched or unbranched alkyl radical as listed under $R_1$. Substituents for alkyl radicals $R_3$ are for example halogen, cyano, $C_1-C_4$alkoxy (e.g. methoxy, ethoxy, n-propoxy and isopropoxy), as well as phenyl which is unsubstituted or substituted by methyl, methoxy and/or halogen, in which phenyl moiety for example 1 to 3, in particular 1 or 2, of these substituents may be present. In preferred compounds, $R_3$ is different from hydrogen and is e.g. benzyl and, in particular, $C_1-C_4$alkyl which is unsubstituted or substituted by $C_1-C_4$alkoxy.

To be singled out for special mention are those compounds of formula (1), wherein Y is the group

and $R_8$ and $R_9$ are hydrogen, and of these compounds in particular those wherein $R_3$ is $C_1-C_4$alkyl which is unsubstituted or substituted by the radicals indicated in the definition of formula (1) and $R_4$, $R_5$ and $R_6$ are each independently $C_1-C_4$-alkyl. In compounds of formula (1), wherein Y is a

group, the radical of the coupling component is thus an unsubstituted or substituted 1,2,3,4-tetrahydroquinoline radical.

Particular mention is also to be made of those compounds of formula (1), wherein Y is a direct bond and $R_8$ and $R_9$ are each independently of the other hydrogen or $C_1-C_4$alkyl, in which case the radical of the coupling component is an unsubstituted or substituted indoline radical. In preferred compounds of formula (1), wherein Y is the direct bond, $R_5$ is hydrogen and $R_6$, $R_8$ and $R_9$ are each independently hydrogen, methyl or ethyl.

$C_1-C_4$alkyl radicals $R_4$, $R_5$, $R_6$, $R_7$, $R_8$ and $R_9$ are each independently an unbranched or branched alkyl radical, e.g. methyl, ethyl, n-propyl, isopropyl and tert-butyl. In preferred compounds, $R_4$, $R_5$ and $R_6$ are each independently methyl or ethyl and $R_7$ is methyl or phenyl.

Customary organic and inorganic, preferably colourless, anions of cationic dyes are suitable anions $X^\ominus$. The anion is generally introduced by the preparatory process (e.g. by quaternisation) or by isolation or purification if carried out. Anions may also be selectively exchanged by customary methods.

Examples of possible anions $X^\ominus$ are: halide (e.g. chloride, bromide or iodide), borotetrafluoride, rhodanide, sulfate, alkyl sulfate (e.g. methyl sulfate or ethyl sulfate), aminosulfate, chlorate, perchlorate, carbonate, bicarbonate, phosphate, phosphomolybdate, phosphotungstate, phosphotungstomolybdate, benzenesulfonate, chlorobenzenesulfonate, naphthalenesulfonate, toluenesulfonate, oxalate, maleate, formiate, acetate, propionate, lactate, succinate, chloracetate, tartrate, methanesulfonate and benzoate anions, as well as complex anions, in particular those of zinc chloride double salts, e.g. the tetrachlorozincate anion.

$X^\ominus$ is conveniently a halide, methylsulfate, ethylsulfate, phosphate, sulfate, carbonate, benzenesulfonate, toluenesulfonate, 4-chlorobenzenesulfonate, acetate, formate or zinc tetrachloride cation; the compounds of the present invention occur in particular as halides (especially chlorides), methosulfates, ethosulfates, sulfates, benzenesulfonates or toluenesulfonates or as zinc chloride double salts (e.g. tetrachlorozincates).

The novel cationic isothiazolazo compounds are readily accessible and can be prepared by methods known per se, for example by diazotising an amine of the formula

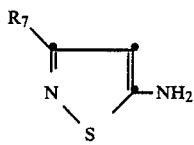  (2)

wherein $R_7$ is as defined for formula (1), coupling the diazonium compound to a coupling component of the formula

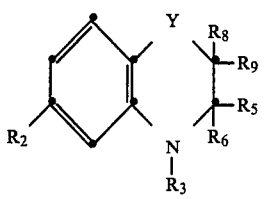  (3)

wherein $R_2$, $R_3$, $R_4$, $R_5$, $R_6$, $R_8$, $R_9$ and Y are as defined for formula (1), and quaternising the coupling product with a compound of the formula $$R_1-X \quad (4)$$

wherein $R_i$ is as defined for formula (1) and X is a radical which is converted into the anion $X^\ominus$ during the quaternisation.

The amines of formula (2) are known and can be prepared by known methods. Examples of such amines are:
5-amino-3-methylisothiazole,
5-aminoisothiazole and
5-amino-3-phenylisothiazole.

The coupling components of formula (3) are also known and can be prepared by known methods. Examples of such components are:
N-methyl-2,2,4,7-tetramethyl-1,2,3,4-tetrahydroquinoline,
N-methyl-2,2,4-trimethyl-1,2,3,4-tetrahydroquinoline,
N-methyl-2,4-diethyl-2-methyl-1,2,3,4-tetrahydroquinoline,
N-ethyl-2,2,4-trimethyl-1,2,3,4-tetrahydroquinoline,
N-methylindoline,
N-methyl-2-methylindoline,
N-methyl-2,3,3-trimethylindoline,
N-ethyl-2,3,3-trimethylindoline.

The diazotisation of the amines of formula (2) is effected in a manner known per se, for example with sodium nitrite in acidic, e.g. hydrochloric, sulfuric or phosphoric, aqueous medium. The diazotisation may also be effected with other diazotising agents, e.g. with nitrosylsulfuric acid. During diazotisation an additional acid may be present in the reaction medium, e.g. phosphoric acid, sulfuric acid, acetic acid, hydrochloric acid or a mixture of these acids, e.g. a mixture of phosphoric acid and acetic acid. It is convenient to effect diazotisation in the temperature range from $-10°$ to $30°$ C., e.g. from $-10°$ C. to room temperature.

The coupling of the diazotised aminoisothiazole to the coupling component of formula (3) is also effected in known manner, for example in acid, aqueous or aqueous-organic medium, advantageously in the temperature range from $-10°$ to $30°$ C., in particular below $10°$ C. Suitable acids are e.g. hydrochloric acid, acetic acid, sulfuric acid or phosphoric acid. Diazotisation and coupling may for example be effected in a process comprising the use of a single vessel, i.e. in the same reaction medium.

The quaternisation is conveniently effected in an indifferent organic solvent, e.g. in a hydrocarbon, chlorinated hydrocarbon or nitrohydrocarbon such as benzene, toluene, xylene, tetrachloroethane, chloroform, carbon tetrachloride, monochlorobenzene, dichlorobenzene or nitrobenzene, in an acid amide or acid anhydride such as dimethylformamide, N-methylacetamide or acetic anhydride, in dimethyl sulfoxide or in a ketone such as acetone or methyl ethyl ketone. An excess of the alkylating agent may also be used in place of an organic solvent. The quaternisation may also be effected in aqueous medium, e.g. in aqueous suspension or in glacial acetic acid. It is advantageous to effect the quaternisation at elevated temperature, e.g. in the range from $30°$ to $200°$ C., in particular from $80°$ to $150°$ C., with or without the addition of an acid acceptor such as an inorganic base, e.g. magnesium oxide, magnesium carbonate, sodium carbonate, calcium carbonate or sodium bicarbonate, with or without pressure. The respective favourable conditions can be determined in a preliminary test.

Known quaternising agents $R_1-X$, which introduce the radical $R_1$ and the radical X of which is converted into the anion $X^\ominus$, are employed for the quaternisation. Examples of such quaternising agents $R_1-X$ are: alkyl halides, haloacetamides, β-halopropionitriles, halohydrines, alkylene oxides, alkyl esters of sulfuric acid or alkyl esters of organic sulfonic acids, e.g. methyl chloride, methyl bromide, methyl iodide, ethyl chloride, ethyl bromide, ethyl iodide, propyl bromide, propyl iodide, butyl bromide, benzyl chloride, benzyl bromide, chloroacetamide, β-chloropropionitrile, ethylene chlorohydrine, dimethyl sulfate, diethyl sulfate, dibutyl sulfate, methyl benzenesulfonate, methyl p-toluenesulfonate, ethyl p-toluenesulfonate, propyl p-toluenesulfonate, butyl p-toluenesulfonate, n-propyl benzenesulfonate, isopropyl benzenesulfonate, n-butyl benzenesulfonate, sec-butyl benzenesulfonate, tert-butyl benzenesulfonate, trimethyloxonium borofluoride, as well as ethylene oxide and propylene oxide.

Examples of preferred quaternising agents $R_1-X$ are alkyl halides, e.g. methyl chloride, ethyl chloride, methyl bromide, ethyl bromide, butyl bromide, methyl iodide or ethyl iodide, and, in particular, alkyl sulfates, e.g. dimethyl sulfate, diethyl sulfate and dibutyl sulfate, and alkyl esters of aromatic sulfonic acids, e.g. methyl p-toluenesulfonate and methyl benzenesulfonate, as well as n-propyl benzenesulfonate, isopropyl benzenesulfonate, n-butyl benzenesulfonate, sec-butyl benzenesulfonate and tert-butyl benzenesulfonate.

Thus the radical X is preferably halogen (e.g. Cl, Br, I), alkyl-$SO_4$- or

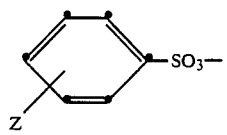

(Z=H, halogen, methyl).

After the quaternisation, the novel compounds of formula (1) can be separated from the reaction medium and then dried or they can be used direct as a solution. If desired or necessary (e.g. for reasons of solubility), the anion $X^\ominus$ in the resultant compounds of formula (1) can be replaced in a manner known per se by another anion.

The novel cationic isothiazolazo compounds of formula (1) are used as dyes for dyeing and, with the addition of binding agents and solvents, for printing materials which can be dyed with cationic dyes, in particular textile fibre materials; said materials consist e.g. of homopolymers or copolymers of acrylonitrile (polyacrylonitrile) or synthetic polyamides or polyesters which are modified by acid groups. In addition, the novel cationic azo compounds also serve to dye gel fibres, plastics materials preferably consisting of the polymers indicated above, as well as tanned cellulose materials, and leather and paper. Said use of the azo compounds of the invention and a process for the dyeing or printing of the above-mentioned materials, which comprises applying one or more of the compounds of formula (1) to said materials or incorporating them into said materials, likewise constitute objects of the present invention, as does the dyed material obtained by this dyeing process.

The cationic dyes of the general formula (1) are particularly suitable for dyeing flocks, fibres, filaments, ribbons, wovens or knits made of polyacrylonitrile or of copolymers of acrylonitrile with other vinyl compounds such as vinyl chloride, vinylidene chloride, vinyl fluoride, vinyl acetate, vinyl pyridine, vinyl imidazole, vinyl alcohol, acrylates, methacrylates, acrylamides, methacrylamides and asymmetric dicyanoethylene, which copolymers contain acrylonitrile in an amount of at least 85%. Flocks, fibres, filaments, ribbons, wovens or knits made of acid modified synthetic materials, in particular acid modified aromatic polyesters and acid modified polyamide fibres can also be dyed. Examples of acid modified aromatic polyesters are the polycondensation products of sulfoterephthalic acid and ethylene glycol, i.e. polyethylene glycol terephthalates which contain sulfonic acid groups.

Dyeing is preferably carried out in aqueous neutral or acid medium by the exhaust process, with or without pressure, or by the pad process. In the dyeing process, the material to be dyed is placed in the dye bath at a temperature in the range from about 40° to 60° C. and then dyed at boiling point. It is also possible to carry out dyeing under pressure at a temperature above 100° C., e.g. in the range from 110° to 130° C., in a pressure dyeing apparatus. The textile material to be dyed may be in various forms, e.g. in the form of fibres, filaments, wovens, knits, piece goods or finished articles.

When applied to the above-mentioned materials, the compounds of formula (1) of the present invention give mainly blue to reddish blue dyeings or prints which possess very good proerties, in particular high pH stability and fastness to steam, rubbing and sublimation. The compounds of formula (1) have very good affinity and good fastness to light. In particular the low molecular compounds of formula (1) have very good migrating properties and therefore give level dyeings.

The compounds of formula (1) of the present invention may be used as dyes for the purposes described above either as individual compounds or in mixtures containing at least 2 dyes of the formula (1).

The invention is illustrated further by the following Examples; unless otherwise stated, parts and percentages are by weight.

EXAMPLE 1

15.5 parts of 5-amino-3-methylisothiazole hydrochloride are dissolved in 75 parts by volume of 85% phosphoric acid and 25 parts by volume of water. The solution is cooled to 0° C. and 50 parts by volume of 2N sodium nitrite solution are added dropwise over about 30 minutes, while keeping the reaction temperature in the range from 0° to +3° C. After the dropwise addition, the diazo solution is stirred for 30 minutes at 0° to +5° C. A solution of 20.5 parts of N-methyl-2,2,4,7-tetramethyl-1,2,3,4-tetrahydroquinoline in 150 parts by volume of ethanol, which solution has been cooled to 0° C., is then added dropwise at 0° to +5° C. over about 30 minutes to the diazo solution. After stirring for 2 hours at 0° to +5° C., the coupling reaction is complete. With stirring, the reaction mass is poured into 500 parts by volume of water, whereupon the dye base of the formula

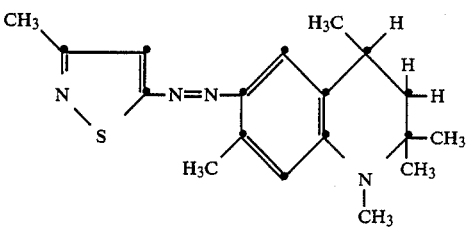

precipitates in readily filterable form. The precipitate is isolated by suction filtration, washed with water until free from salt and acid and is then dried in vacuo at 50° to 60° C. Yield: 28.5 parts (87% of theory).

16.4 parts of the resultant dye base are dissolved in 250 parts by volume of dimethylformamide and then 10.0 parts by volume of dimethyl sulfate are added dropwise at 90° to 100° C. The resultant solution is stirred for 6 hours at 90° to 100° C. The quaternisation is now quantitative, as can be confirmed by thin-layer chromatography. The solvent is distilled off under reduced pressure and the residual dye oil is taken up in 400 parts by volume of warm water. The dye solution is clarified by filtration and the dye is precipitated in the customary manner by adding sodium chloride and zinc chloride. After filtration and drying, 20.5 parts of the dye of the formula

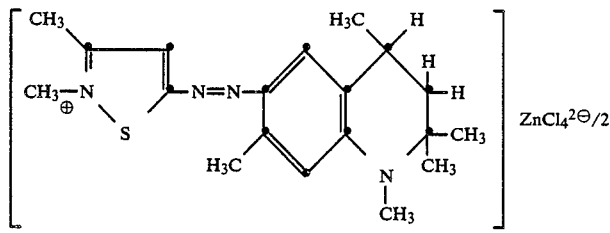

are obtained ($\lambda_{max}=608$ nm; measured in methanol).

This dye dyes polyacrylonitrile in reddish blue shades. The dyeings are fast to light, steam and decatising.

EXAMPLE 2

6.3 parts of the dye base of the formula

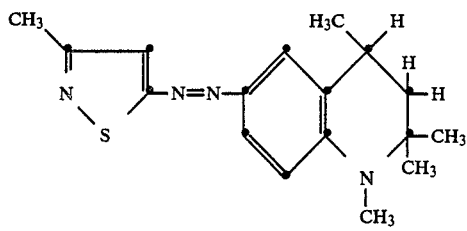

obtained by diazotising 5-amino-3-methylisothiazole hydrochloride and coupling the resultant diazonium salt to N-methyl-2,2,4-trimethyl-1,2,3,4-tetrahydroquinoline in accordance with the procedure described in Example 1, are dissolved in 100 parts by volume of chlorobenzene at 90° C. 3.8 parts by volume of dimethyl sulfate are then added dropwise and the batch is stirred for 4 hours at 90° to 100° C. The batch is then allowed to cool and the precipitated dye of the formula

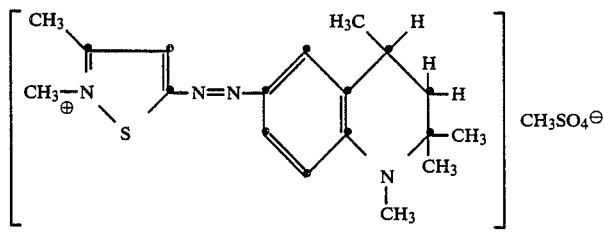

is isolated by filtration and dried in vacuo. The dye ($\lambda_{max}=602$ nm; measured in methanol) dyes acrylonitrile in a blue shade. The dyeings are fast to light, steam and decatising.

EXAMPLE 3

6.8 parts of the dye base of the formula

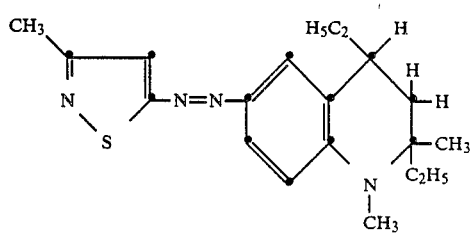

obtained by diazotising 5-amino-3-methylisothiazole hydrochloride and coupling the resultant diazonium salt to N-methyl-2,4-diethyl-2-methyl-1,2,3,4-tetrahydroquinoline in accordance with the procedure described in Example 1, are dissolved in 100 parts by volume of dimethylformamide at 90° to 100° C. 4.0 parts by volume of dimethyl sulfate are then added dropwise and the batch is allowed to react for 6 hours at 90° to 100° C. The solvent is distilled off under reduced pressure and the residual dye is taken up in 150 parts by volume of warm water. The dye solution is clarified by filtration and the dye is precipitated by adding sodium chloride and zinc chloride.

The resultant dye of the formula

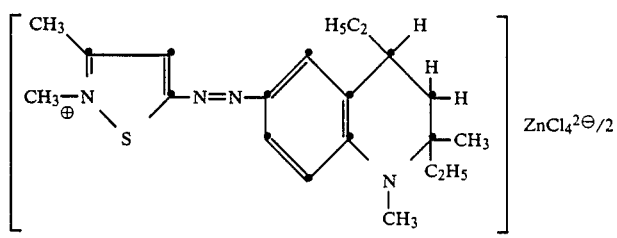

($\lambda_{max}=602$ nm; measured in methanol) is isolated by suction filtration and dried in vacuo. It dyes polyacrylonitrile in a blue shade. The dyeings are fast to light, steam and decatising.

The following Table 1 shows further dyes which are obtained in accordance with the procedure described in Example 1. They are of the formula

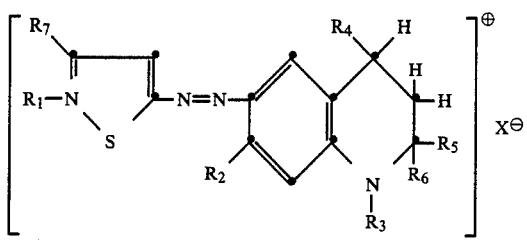

wherein the symbols have the meanings indicated in the individual columns.

minutes to the resultant diazo solution. After further stirring at 0° to 5° C., the coupling is complete and, with stirring, the reaction mass is poured into 500 parts by volume of water, whereupon the dye base of the formula

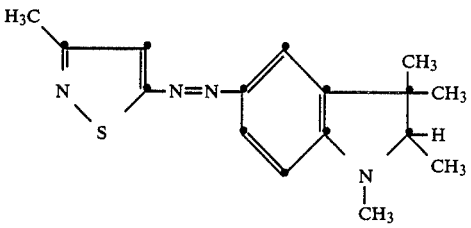

precipitates. The dye base is isolated by filtration, washed with water until free from salt and acid and is then dried in vacuo.

14.5 parts of this dye are quaternised with dimethyl sulfate as described in Example 1 and the quaternisation product is precipitated with NaCl and ZnCl$_2$, thus affording the dye of the formula

TABLE 1

| Ex. No. | $R_1$ | $R_2$ | $R_3$ | $R_4$ | $R_5$ | $R_6$ | $R_7$ | $X^\ominus$ | Shade on polyacrylonitrile |
|---|---|---|---|---|---|---|---|---|---|
| 4 | $C_2H_5$ | $CH_3$ | $CH_3$ | $CH_3$ | $CH_3$ | $CH_3$ | $CH_3$ | $ZnCl_4{}^{2\ominus}/2$ | reddish blue |
| 5 | $C_2H_5$ | H | $CH_3$ | $CH_3$ | $CH_3$ | $CH_3$ | $CH_3$ | " | blue |
| 6 | $C_2H_4OH^*$ | H | $CH_3$ | $CH_3$ | $CH_3$ | $CH_3$ | $CH_3$ | " | reddish blue |
| 7 | $CH_3$ | H | $C_2H_5$ | $CH_3$ | $CH_3$ | $CH_3$ | $CH_3$ | " | blue |
| 8 | $CH_3$ | $CH_3$ | $C_2H_5$ | $CH_3$ | $CH_3$ | $CH_3$ | $CH_3$ | " | reddish blue |
| 9 | $CH_3$ | H | $C_2H_4OCH_3$ | $CH_3$ | $CH_3$ | $CH_3$ | $CH_3$ | " | blue |
| 10 | $CH_3$ | $CH_3$ | $C_2H_4OCH_3$ | $CH_3$ | $CH_3$ | $CH_3$ | $CH_3$ | " | reddish blue |
| 11 | $CH_3$ | $C_2H_5$ | $CH_3$ | $CH_3$ | $CH_3$ | $CH_3$ | $CH_3$ | " | reddish blue |
| 12 | $CH_3$ | H | $C_4H_9$ | $CH_3$ | $CH_3$ | $CH_3$ | $CH_3$ | " | blue |
| 13 | $CH_3$ | H | $CH_3$ | $CH_3$ | $CH_3$ | $CH_3$ | (fused ring) | " | blue |
| 14 | $C_2H_4OH^*$ | H | $CH_3$ | $C_2H_5$ | $CH_3$ | $C_2H_5$ | $CH_3$ | " | blue |

*The quaternisation is effected with ethylene oxide.

The above compounds may also be isolated with another anion, e.g. as chloride, iodide, bromide or acetate if they are precipitated from the reaction solution with a corresponding salt (e.g. NaCl, KBr, KI, Na acetate etc.). They may also be isolated direct as methosulfates (see Example 2).

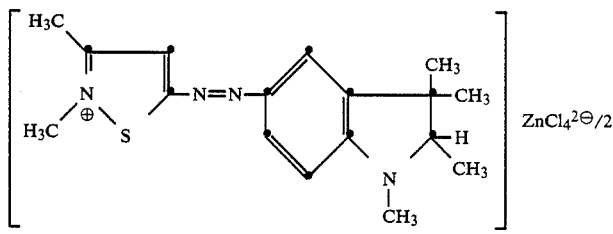

which dyes polyacrylonitrile in a reddish blue shade.

The compounds shown in the following Table 2 are obtained by a procedure analogous to that described in Example 15 using the corresponding indoline coupling components. The compounds in Table 2 are of the formula

EXAMPLE 15

15.5 parts of 5-amino-3-methylisothiazole hydrochloride are diazotised as described in Example 1. A solution of 16.6 parts of N-methyl-2,3,3-trimethylindoline in 150 parts by volume of ethanol, which solution has been cooled to 0° C., is added dropwise at 0° to 5° C. over 30

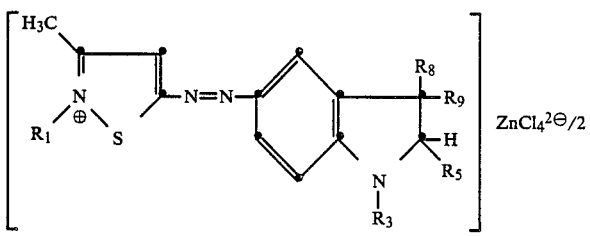

TABLE 2

| Ex. No. | R₁ | R₃ | R₅ | R₈ | R₉ | Shade on polyacrylonitrile |
|---|---|---|---|---|---|---|
| 16 | CH₃ | CH₃ | H | H | H | reddish blue |
| 17 | CH₃ | CH₃ | CH₃ | H | H | reddish blue |
| 18 | CH₃ | C₂H₅ | CH₃ | H | H | reddish blue |
| 19 | C₂H₄OH* | CH₃ | CH₃ | CH₃ | CH₃ | reddish blue |

*The quaternisation is effected with ethylene oxide.

EXAMPLE 20

A polyacrylonitrile fabric is placed at 60° C. into an aqueous bath (liquor to goods ratio 1:80) which contains, per liter, 0.125 g of glacial acetic acid, 0.375 g of sodium acetate and 0.05 g of the dye described in Example 1 (or the corresponding amount of a solid or liquid formulation of said dye). The bath is heated over 20 to 30 minutes to boiling point and is then kept for 90 minutes at this temperature. After rinsing, a blue dyeing of good fastness is obtained.

EXAMPLE 21

An acid modified polyester fabric is placed at 20° C. into an aqueous bath (liquor to goods ratio 1:40) which contains, per liter, 3 g of sodium sulfate, 2 g of ammonium sulfate and 2.5 g of a carrier on the basis of a non-ionic dyeing assistant and which is adjusted with formic acid to pH 5.5. The bath is heated to 60° C. and 0.15 g of the dye described in Example 1 (or the corresponding amount of a solid or liquid formulation of said dye) is added and the bath is then heated to boiling point in about 30 minutes. The bath is kept for 60 minutes at this temperature. After subsequent rinsing and drying, a blue dyeing of good fastness properties is obtained.

EXAMPLE 22

An acid modified polyester fabric is placed at 20° C. into an aqueous bath (liquor to goods ratio 1:30) which contains, per liter, 6 g of sodium sulfate, 2 g of ammonium sulfate and 0.15 g of the dye described in Example 1 (or the corresponding amount of a solid or liquid formulation of said dye). The bath is adjusted with formic acid to pH 5.5. The dyeing is carried out in a closed vessel by heating over 45 minutes to 120° C. and maintaining this temperature, with shaking, for 60 minutes. After rinsing and drying, a blue dyeing with good fastness properties is obtained.

EXAMPLE 23

An acid modified polyamide fabric is placed at 20° C. into an aqueous bath (liquor to goods ratio 1:80) which contains, per liter, 3.6 g of potassium dihydrogen phosphate, 0.7 g of disodium phosphate, 1 g of an assistant, e.g. a reaction product of a phenol with excess ethylene oxide, and 0.075 g of the dye described in Example 1 (or the corresponding amount of a solid or liquid formulation of said dye). The bath is heated in about 30 minutes to boiling point and is kept at this temperature for 60 minutes. After rinsing and drying, a blue dyeing of good fastness properties is obtained.

By repeating the dyeing procedures of Examples 20 to 23 but using dyes described in Examples 2 to 19 in place of the dye of Example 1, fabrics dyed in blue to reddish blue shades are also obtained.

What is claimed is:

1. A cationic isothiazolazo compound of the formula

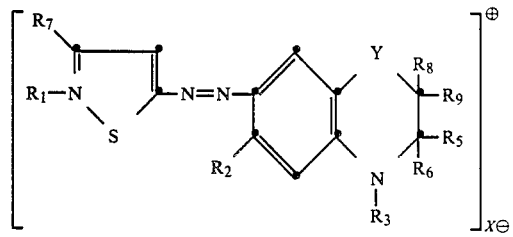

wherein

R1 is C1-C4-alkyl unsubstituted or substituted by hydroxy, halogen, aminocarbonyl, C1-C4-alkoxycarbonyl, C1-C4-alkylcarbonyl, C1-C4-alkylcarbonyloxy, phenyl, phenoxy or benzyloxy, the phenyl groups of the last three substituents being unsubstituted or substituted by methyl, methoxy or halogen, R2 is hydrogen or C1-C4-alkyl, R3 is hydrogen or C1-C4-alkyl which is unsubstituted or substituted by halogen, cyano, C1-C4-alkoxy or by phenyl which is in turn unsubstituted or substituted by methyl, methoxy or halogen, R5 and R6 are each independently of the other hydrogen or C1-C4-alkyl, R7 is hydrogen, C1-C4-alkyl or phenyl, Y is the direct bond or the group

wherein R4 is hydrogen or C1-C4-alkyl,

R8 and R9 are each hydrogen and, if Y is the direct bond, they are each independently of the other hydrogen or C1-C4-alkyl, and X is an anion.

2. A cationic isothiazolazo compound of the formula

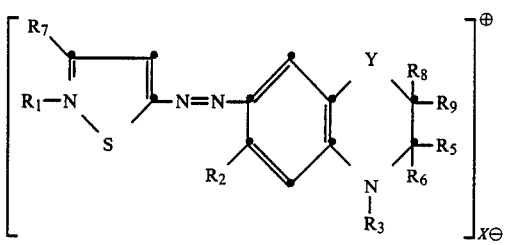

according to claim 1, wherein

R₁ is $C_1$–$C_4$alkyl unsubstituted or substituted by hydroxy, halogen, aminocarbonyl, $C_1$–$C_4$alkoxycarbonyl, $C_1$–$C_4$-alkylcarbonyl, $C_1$–$C_4$alkylcarbonyloxy, phenyl, phenoxy or benzyloxy, the phenyl groups of the last three substituents being unsubstituted or substituted by methyl, methoxy or halogen;

R₂ is hydrogen or $C_1$–$C_4$alkyl;

R₃ is hydrogen or $C_1$–$C_4$alkoxy or by phenyl which is unsubstituted or substituted by methyl, methoxy or halogen;

R₅ and R₆ are each independently of the other $C_1$–$C_4$alkyl;

R₇ is hydrogen, $C_1$–$C_4$alkyl or phenyl;

Y is the group

wherein R₄ is $C_1$–$C_4$alkyl;

R₈ and R₉ are each hydrogen; and

X is an anion.

3. A cationic isothiazolazo compound of claim 2, wherein Y is the group

R₄, R₅ and R₆ are each independently $C_1$–$C_4$alkyl and R₈ and R₉ are hydrogen.

4. A cationic isothiazolazo compound of claim 2, wherein R₁ is methyl or ethyl, each unsubstituted or substituted by hydroxy.

5. A cationic isothiazolazo compound of claim 2, wherein R₂ is hydrogen, methyl or ethyl.

6. A cationic isothiazolazo compound of claim 2, wherein R₃ is $C_1$–$C_4$alkyl which is unsubstituted or substituted by $C_1$–$C_4$alkoxy.

7. A cationic isothiazolazo compound of claim 2, wherein R₄, R₅ and R₆ are each independently methyl or ethyl.

8. A cationic isothiazolazo compound of claim 2, wherein R₇ is methyl or phenyl.

9. A compound of the formula

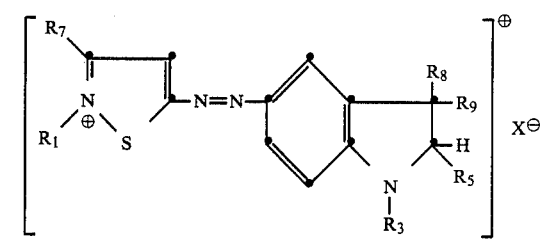

according to claim 2.

10. A compound according to claim 9 wherein R1 is methyl or hydroxyethyl and R3, R5, R6, R8 and R9 are hydrogen or methyl.

11. A cationic isothiazolazo compound of claim 9, wherein Y is the direct bond and R₈ and R₉ are each independently hydrogen or $C_1$–$C_4$alkyl.

12. A cationic isothiazolazo compound of claim 11, wherein R₅ is hydrogen and R₆, R₈ and R₉ are each independently hydrogen, methyl or ethyl.

13. A compound of the formula

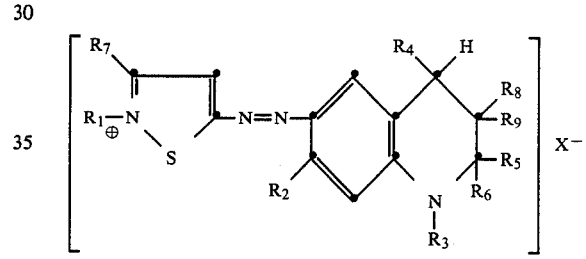

according to claim 2.

14. A compound of the formula

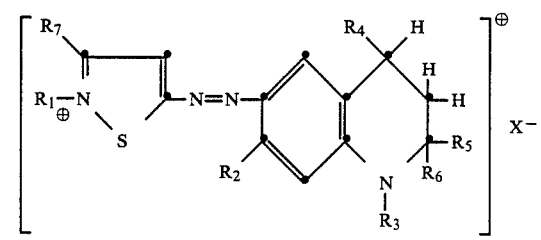

according to claim 13.

15. A compound according to claim 13 wherein R1 is methyl, ethyl, hydroxymethyl or hydroxyethyl.

16. A compound according to claim 13 wherein R3 is C1-C4-alkyl or C1-C4-alkyl substituted by C1-C4-alkoxy.

* * * * *